July 4, 1939.  W. R. UHLEMANN  2,164,557
LENS MOUNTING
Filed Nov. 26, 1937
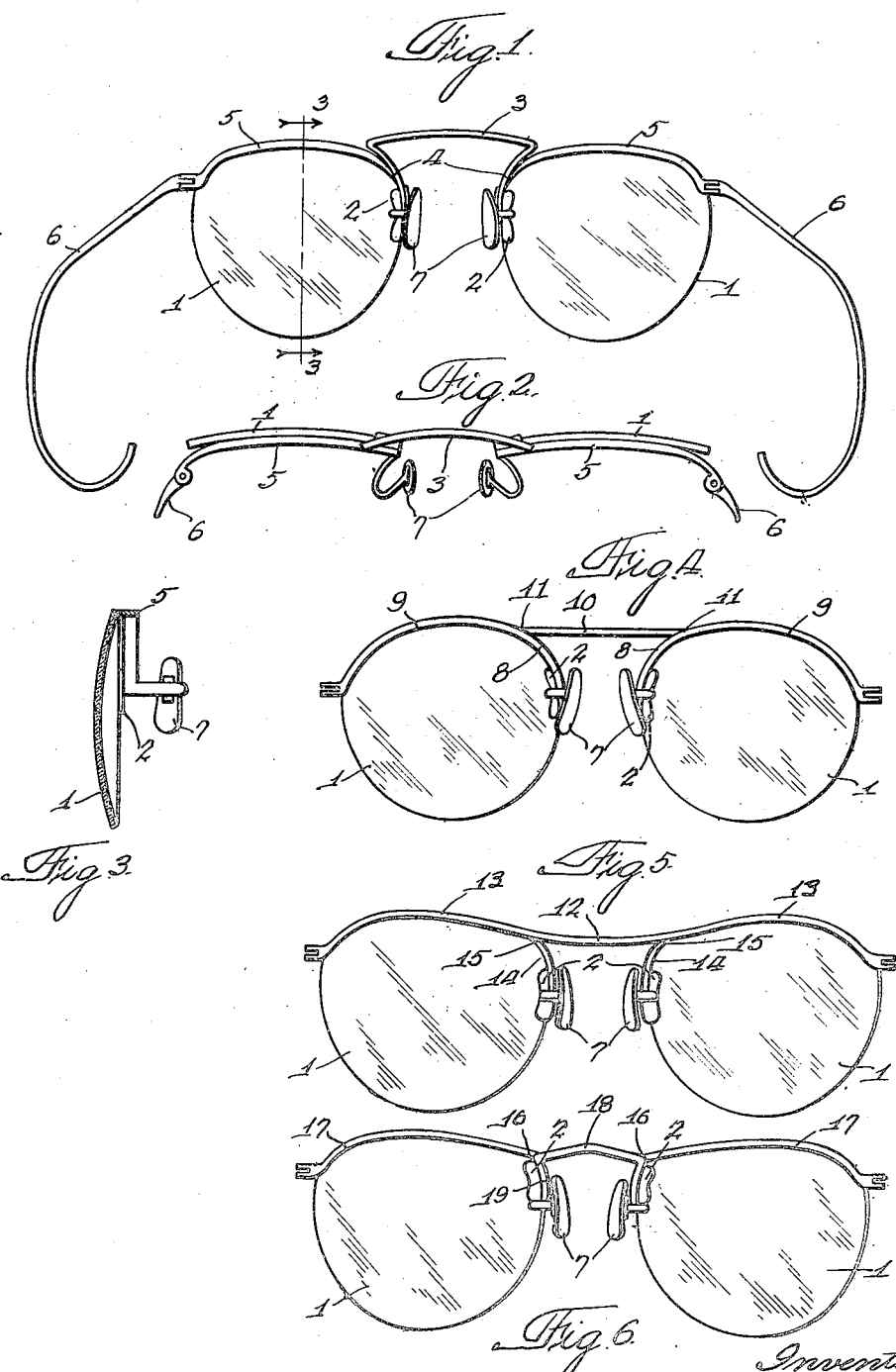

Patented July 4, 1939

2,164,557

UNITED STATES PATENT OFFICE 2,164,557

LENS MOUNTING

William R. Uhlemann, Evanston, Ill., assignor to Uhlemann Optical Co. of Illinois, Chicago, Ill., a corporation of Delaware Application November 26, 1937, Serial No. 176,467

1 Claim. (Cl. 88—47)

My invention relates to a lens mounting.

One of the objects of my invention is to provide a lens mounting in which temple-supporting wires are provided which lie in the rear of the lens and follow the contour of the outer edge of the lens, in which there will be minimum restriction of vision due to the mounting.

A further object of my invention is to provide such a construction in which a "high bridge" frame is obtained.

A further object of my invention is to provide such a construction in which the bridge and straps can be made up as a unit and the temple-supporting wires thereafter secured to this unit.

Further objects and advantages of the invention will be apparent from the description and claim.

In the drawing, in which several forms of my invention are shown,

Figure 1 is a rear elevational view of the lens mounting, showing the lenses;

Fig. 2 is a view looking down on Fig. 1;

Fig. 3 is a section on the line 3—3 of Fig. 1;

Fig. 4 is a rear view of a different form of lens mounting showing the lenses;

Fig. 5 is a rear view of another form of lens mounting; and

Fig. 6 is a rear view showing still another form of lens mounting.

Referring to the drawing in detail, and first to Figs. 1, 2, and 3, the construction comprises a pair of lenses 1, a pair of channel-like metal straps 2 embracing and holding the nasal edges of the lenses, a bridge member 3 formed of wire having downwardly- and inwardly-extending portions 4 secured adjacent the back portions of the straps 2, a pair of temple-supporting wires 5 secured to said downwardly-extending portions 4 and extending along and in the rear of the upper edges of the lenses 1, and a pair of temples 6 pivotally secured to these temple-supporting wires 5. The downwardly-extending wires 4 may be secured to the straps 2 by a fusion method; for example, by soldering, and the temple-supporting wires 5 may also be secured to the downwardly-extending portions 4 by a fusion method. All of the parts of the frame, with the exception of the straps, may be formed of flexible wire bent to suitable shapes, the temple-supporting wires 5 being bent to conform closely to the upper edges of the lenses in order to obstruct vision as little as possible. In this form, it will be noted that the bridge portion 3 and the downwardly-extending strap-supporting wires 4 may be shaped and designed to suit the individual wearer and that the temple-supporting wires 5 may thereafter be secured to the bridge. This is an advantage in manufacture as the temple-supporting wires 5 may be made up and kept in stock to be used with the bridge and strap mounting when these are made up separately for the wearer. It will be noted that the strap-supporting wires 4 are secured adjacent the back portion of the channeled strap 2 so as to interfere as little as possible with vision and so as to enable the side or wing portions of the channel-like straps to be readily manipulated in securing the lenses in position.

The usual nose guard pads 7 may be secured to the lens-supporting straps.

The construction shown in Fig. 4 is similar in many respects to that shown in Fig. 1, except that here the wire portions 8 which are secured to the straps 2 are formed integrally with the temple-supporting wire portions 9, and the bridge 10 is a simple piece of wire secured to the wires which support the temples and straps at the points 11, as by soldering or the like.

The construction shown in Fig. 5 is similar to those previously described, except here the bridge wire portion 12 is formed integrally with the temple-supporting wire portions 13, and the wire portions 14 which support the straps 2 are secured to this integral wire, as by soldering or the like, at the points 15.

The construction shown in Fig. 6 is quite similar to that shown in Fig. 1, except that here the straps 2 are located adjacent the upper nasal edges of the lenses 1 and the straps extend almost to the junction 16 of the temple-supporting wires 17 with the bridge 18, which has downwardly-extending portions 19 which may be soldered to the straps 2.

Further modifications will be apparent to those skilled in the art and it is desired, therefore, that the invention be limited only by the prior art and the scope of the appended claim.

Having thus described my invention, what I claim and desire to secure by Letters Patent is:

An ophthalmic lens mounting comprising a pair of lens supporting straps of channel cross section having elongated flanges between which the nasal edges of the lenses are held, a trilateral bridging piece connecting said straps having two side portions following the contour of said straps and the nasal edges of the lenses and lying in general in the rear thereof and fused to the rear flanges of the straps, and a top central portion connecting said two side portions, and a pair of temple-supporting wires supported by said bridging piece and secured thereto by fusion at points adjacent the junction of the side portions of the bridging piece with the top portion thereof and following the contour of the upper edges of the lenses and lying in general in the rear thereof and terminating in the temple connection.

WILLIAM R. UHLEMANN.